Oct. 4, 1932.  C. S. CRICKMER  1,880,835
DISPLAY DEVICE
Filed Oct. 30, 1931
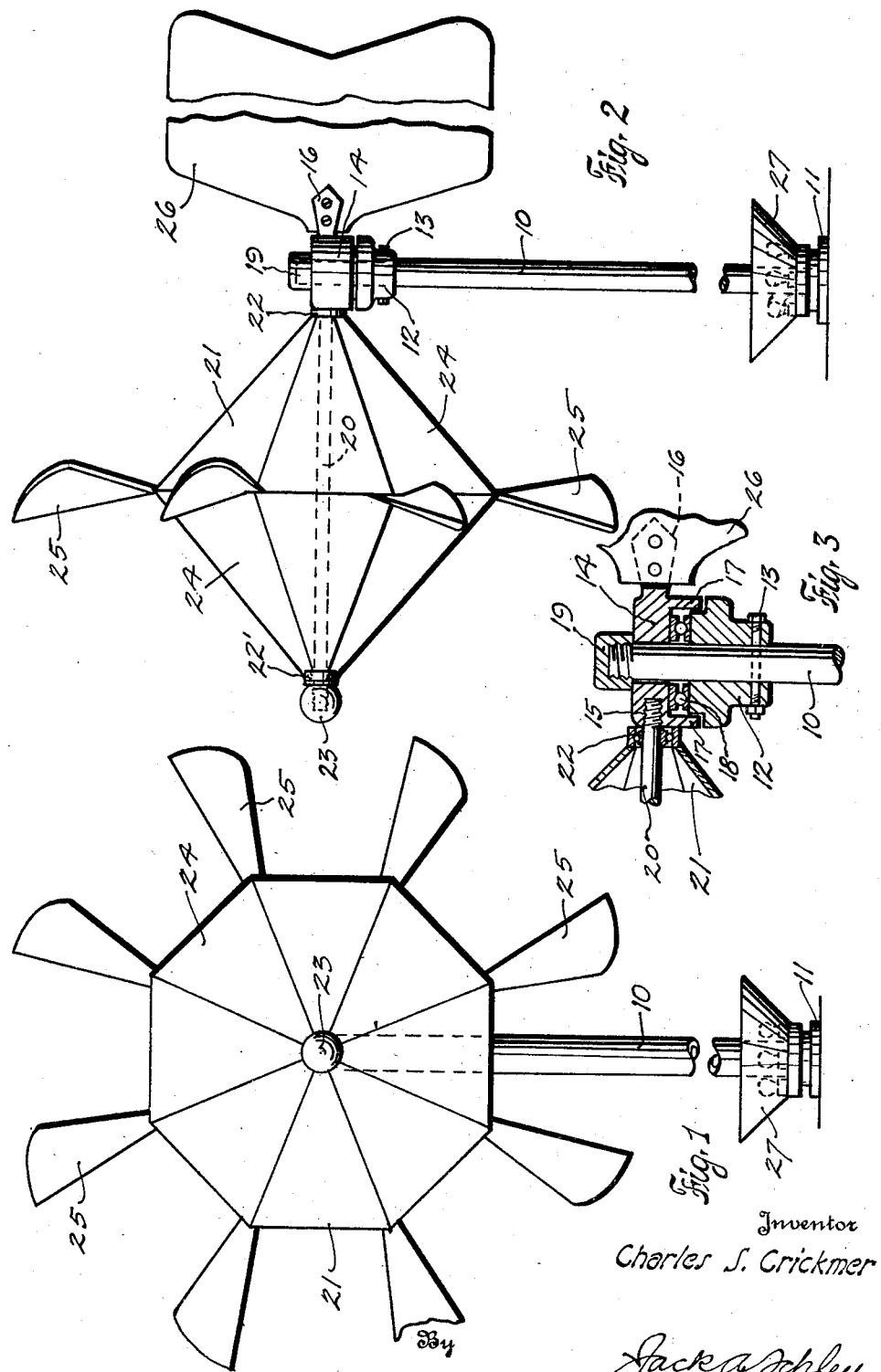
Inventor
Charles S. Crickmer
By Jack A. Schley
Attorney Patented Oct. 4, 1932

1,880,835

UNITED STATES PATENT OFFICE

CHARLES S. CRICKMER, OF DALLAS, TEXAS

DISPLAY DEVICE

Application filed October 30, 1931. Serial No. 572,036.

This invention relates to new and useful improvements in display devices.

One object of the invention is to provide an improved display device having new and novel means for attracting attention in the daytime or at night.

Another object of the invention is to provide a display device comprising a wind rotated body having a plurality of reflecting panels at divergent angles for reflecting light rays in various directions.

A further object of the invention is to provide a display device including a light reflecting body mounted to rotate in an orbit and also to revolve and having wind impelled elements, whereby said body is caused to move in two directions, thus offering a pleasing appearance and casting reflections so as to attract attention.

A construction designed to carry out the invention will be hereinafter described together with other features of the invention.

The invention will be more readily understood from a reading of the following specification and by reference to the accompanying drawing in which an example of the invention is shown, and wherein:

Figure 1 is a front elevation of a device constructed in accordance with the invention, Figure 2 is a side elevation of the same, and Figure 3 is a vertical sectional view of the central bearing members.

In the drawing the numeral 10 designates a post or mast mounted on a suitable base 11. Near the top of the post is fastened a mounting block 12 by a bolt 13. On the top of the mounting block are any type of ball bearings 18 suitable for the purpose. A rotating collar 14 rests on the ball bearings which facilitate the turning of the said collar. The rotating collar is provided with a threaded socket 15 and a split bracket 16 diametrically opposite thereto. An annular guard flange 17 depends from the said collar and shields the bearings 18 from rain and from dirt. A cap nut 19 is provided on top of the post 10 to hold the rotating collar 14 in position. A shaft 20 has its ends screw-threaded and its inner end is engaged in the threaded socket 15 on the rotating collar 14, and extends outwardly therefrom and forms the axial support for a diamond-shaped body 21. This body is mounted on ball bearings 22 and 22' on its most extreme points. A cap nut 23 is provided on the outer end of the shaft to hold said body against longitudinal displacement.

The diamond shaped body 21 is composed of triangular shaped reflecting panels 24. These panels are preferably made of sheet metal finished or plated so as to provide reflecting surfaces, but may be made of any material suitable for the purpose. The panels have their base angles together. The reflecting panels on the forward portion of the body have their surfaces at an angle to each other and at divergent angles to the surfaces of the reflecting panels on the rear portion of the body. The surfaces of the rear panels 24 are also at divergent angles to each other. The body simulates the facets of a cut diamond stone.

The body is provided at its medial circumference with radially extending and transversely curved wings 25. These wings when impinged by the wind or air currents will provide impelling means for the body 21.

In the split bracket 16 is mounted a rudder blade 26. This blade is provided for two purposes, one of which is to head the body into the wind, and the other is to provide display spaces upon opposite sides, upon which suitable displays may be exhibited. This rudder also acts to rotate the device and cause it to shift with the wind.

An inverted conical reflector 27 may be mounted intermediate the ends of the mast 10. The reflector is mounted low enough on the post so that its rays will light the rudder 26 and also the reflecting panels 22.

In operation, when the wind is blowing it strikes the rudder and turns the display device into the wind. The wind will strike the curved wings and revolve the body. Rays of light, either from natural sources in the daytime or from artificial sources at night, striking the reflecting panels will illuminate the same and cause reflections to be cast at various angles. When the body is revolved a brilliant and scintillating display will be produced and thereby attract the attention of observers. The attractiveness of the device will be enhanced by the rotation or movements of the body in its orbit of rotation. The angular disposition of the panels will produce varying reflections from the positions of different observers. It is within the scope of the invention to color the panels and thereby add to the pleasing appearance of the device.

Various changes in the size and shape of the different parts, as well as modifications and alterations, may be made within the scope of the appended claims.

Having illustrated and described a preferred form of the invention, what I claim, is:

1. In a display device, a rotatable support, means for mounting said support, a diamond shaped body having reflecting panels diverging from its medial circumference, curved wind impelled elements mounted on the body at its medial circumference, and a rudder blade attached to said rotating support for directing the body into the wind.

2. In a display device, a rotatable support, means for mounting said support, a diamond shaped body, reflecting panels on said body diverging from its medial circumference, curved wind impelled wings mounted on the medial circumference of the said body, and a rudder blade attached to said rotating support for directing the body into the wind.

3. In a display device, a support, a rotatable collar mounted on said support, a diamond shaped revolvable body mounted on the said collar, triangular shaped reflecting panels attached onto the said body and diverging from the medial circumference of the body, curved wind impelled wings mounted on the body on its medial circumference, and a rudder blade attached to said rotating collar for directing the body into the wind.

4. In a display device, a post, a mounting block mounted on the post, a rotating collar mounted on the post, ball bearings interposed between the block and the collar, a shaft mounted on the collar and extending therefrom, a diamond shaped body journaled on the shaft, triangular shaped reflecting panels attached onto the said body and diverging from the medial circumference of the body, curved wind impelled wings mounted on the body on its medial circumference, a bracket on the collar, and a rudder blade attached to said bracket for directing the body into the wind.

In testimony whereof I affix my signature.

CHARLES S. CRICKMER.